(12) United States Patent
Larsson

(10) Patent No.: US 9,446,476 B2
(45) Date of Patent: Sep. 20, 2016

(54) BACKING ARRANGEMENT FOR USE IN FRICTION STIR WELDING

(75) Inventor: Rolf Larsson, Laxå (SE)

(73) Assignee: ESAB AB, Gothenburg (SE)

( * ) Notice: Subject to any disclaimer, the term of this patent is extended or adjusted under 35 U.S.C. 154(b) by 0 days.

(21) Appl. No.: 14/375,548

(22) PCT Filed: Feb. 9, 2012

(86) PCT No.: PCT/SE2012/050127
§ 371 (c)(1),
(2), (4) Date: Jul. 30, 2014

(87) PCT Pub. No.: WO2013/119154
PCT Pub. Date: Aug. 15, 2013

(65) Prior Publication Data
US 2015/0328714 A1    Nov. 19, 2015

(51) Int. Cl.
*B23K 20/12* (2006.01)
*B23K 37/02* (2006.01)
*B23K 37/04* (2006.01)

(52) U.S. Cl.
CPC .......... *B23K 20/126* (2013.01); *B23K 20/129* (2013.01); *B23K 20/1225* (2013.01); *B23K 37/02* (2013.01); *B23K 37/04* (2013.01)

(58) Field of Classification Search
None
See application file for complete search history.

(56) References Cited

U.S. PATENT DOCUMENTS

| | | | |
|---|---|---|---|
| 3,771,706 A | 11/1973 | Martens | |
| 5,769,306 A * | 6/1998 | Colligan | B23K 20/126 228/112.1 |
| 6,068,178 A * | 5/2000 | Michisaka | B23K 20/126 228/112.1 |
| 6,070,784 A * | 6/2000 | Holt | B23K 20/126 228/112.1 |
| 6,173,880 B1 * | 1/2001 | Ding | B23K 20/12 156/73.5 |
| 6,247,633 B1 * | 6/2001 | White | B23K 20/123 228/112.1 |
| 6,247,634 B1 * | 6/2001 | Whitehouse | B23K 20/126 228/112.1 |
| 6,257,479 B1 * | 7/2001 | Litwinski | B23K 20/126 228/112.1 |

(Continued)

FOREIGN PATENT DOCUMENTS

EP    01086779 A1    3/2001
JP    H11226756 A    8/1998

(Continued)

OTHER PUBLICATIONS

International Search Report regarding PCT/SE2012/050127—completed Sep. 26, 2012.

(Continued)

*Primary Examiner* — Kiley Stoner

(57) ABSTRACT

Backing arrangement for supporting a welded seam extending on a curved path which is formed between two curved work pieces by friction stir welding with a welding tool separate from the backing arrangement, which backing arrangement comprises a backing body which is intended to bear upon the work pieces opposite said welding tool to assume at least a part of the compression force that is exerted by the welding tool against the work pieces to keep the material plasticized during the welding operation in the area of the welded seam The backing body is equipped with a shoulder which exhibits a bottom surface turned outward, via which the backing body is equipped to bear on the work pieces. A driving mechanism is situated to rotate and/or oscillate the shoulder so that the bottom surface of the shoulder can thereby be made to carry out a rotating and/or oscillating motion against the work pieces for creating fictional heat in them.

14 Claims, 4 Drawing Sheets

(56) References Cited

U.S. PATENT DOCUMENTS

| | | | | |
|---|---|---|---|---|
| 6,259,052 B1* | 7/2001 | Ding | B23K 20/123 | 219/125.11 |
| 6,299,048 B1* | 10/2001 | Larsson | B23K 20/122 | 228/112.1 |
| 6,364,197 B1* | 4/2002 | Oelgoetz | B23K 20/122 | 228/112.1 |
| 6,367,681 B1* | 4/2002 | Waldron | B23K 20/123 | 228/112.1 |
| 6,419,142 B1* | 7/2002 | Larsson | B23K 20/126 | 228/112.1 |
| 6,450,395 B1* | 9/2002 | Weeks | B23K 20/1245 | 228/112.1 |
| 6,460,752 B1* | 10/2002 | Waldron | B23K 20/126 | 228/112.1 |
| 6,484,924 B1* | 11/2002 | Forrest | B23K 20/126 | 228/103 |
| 6,554,175 B1* | 4/2003 | Thompson | B23K 20/123 | 228/112.1 |
| 6,601,751 B2* | 8/2003 | Iwashita | B23K 20/123 | 228/112.1 |
| 8,033,443 B1* | 10/2011 | Sigler | B23K 20/126 | 228/112.1 |
| 2001/0015369 A1 | 8/2001 | Litwinski et al. | | |
| 2001/0038028 A1* | 11/2001 | Iwashita | B23K 20/123 | 228/112.1 |
| 2001/0040179 A1* | 11/2001 | Tochigi | B23K 20/126 | 228/2.1 |
| 2002/0190101 A1* | 12/2002 | Nelson | B23K 20/126 | 228/112.1 |
| 2003/0029903 A1* | 2/2003 | Kashiki | B23K 20/123 | 228/112.1 |
| 2003/0066869 A1* | 4/2003 | Johnson | B23K 1/018 | 228/264 |
| 2004/0079787 A1* | 4/2004 | Okamoto | B23K 20/125 | 228/112.1 |
| 2006/0231594 A1* | 10/2006 | Murakawa | B23K 20/1265 | 228/112.1 |
| 2006/0231595 A1 | 10/2006 | Quinn | | |
| 2007/0187466 A1* | 8/2007 | Sayama | B23K 20/126 | 228/101 |
| 2007/0284419 A1* | 12/2007 | Matlack | B23K 20/26 | 228/112.1 |
| 2008/0023524 A1* | 1/2008 | Ohashi | B23K 20/1245 | 228/2.1 |
| 2008/0135601 A1* | 6/2008 | Chen | B23K 20/1235 | 228/102 |
| 2008/0265007 A1* | 10/2008 | Iimura | B23K 37/0408 | 228/212 |
| 2009/0068492 A1* | 3/2009 | Fujii | B23K 9/173 | 428/615 |
| 2009/0084828 A1* | 4/2009 | Sohl | B21B 15/0085 | 228/44.3 |
| 2009/0120995 A1* | 5/2009 | Hallinan | B23K 20/1255 | 228/2.3 |
| 2009/0159639 A1* | 6/2009 | Fukuhara | B23K 20/1265 | 228/2.1 |
| 2009/0294514 A1* | 12/2009 | Babb | B23K 20/126 | 228/112.1 |
| 2010/0006622 A1* | 1/2010 | Smith | B23K 20/125 | 228/2.1 |
| 2010/0051672 A1* | 3/2010 | Nunnery | B23K 37/0531 | 228/212 |
| 2010/0083483 A1* | 4/2010 | Carter | B21D 39/0931 | 29/509 |
| 2010/0163604 A1* | 7/2010 | Noe | B21C 47/247 | 228/114 |
| 2010/0176182 A1* | 7/2010 | Hanlon | B23K 20/1245 | 228/2.1 |
| 2010/0213244 A1* | 8/2010 | Miryekta | B23K 20/122 | 228/112.1 |
| 2010/0288820 A1* | 11/2010 | Aliaga | B23K 20/1255 | 228/112.1 |
| 2010/0325889 A1* | 12/2010 | Buttress | B23K 9/0286 | 29/890.033 |
| 2012/0006883 A1* | 1/2012 | Nishida | B23K 20/123 | 228/112.1 |
| 2012/0104077 A1* | 5/2012 | Tian | B23K 1/0016 | 228/212 |
| 2012/0118937 A1* | 5/2012 | Enzaka | B23K 20/123 | 228/112.1 |
| 2012/0125973 A1* | 5/2012 | Packer | B23K 20/126 | 228/2.1 |
| 2012/0248174 A1* | 10/2012 | dos Santos | B23K 20/122 | 228/2.1 |
| 2012/0279441 A1* | 11/2012 | Creehan | B23K 20/12 | 118/76 |
| 2012/0279442 A1* | 11/2012 | Creehan | B23K 20/1225 | 118/76 |
| 2012/0328837 A1* | 12/2012 | Goehlich | B23K 20/1255 | 428/156 |

FOREIGN PATENT DOCUMENTS

| | | | | |
|---|---|---|---|---|
| JP | 2001025886 A | | 1/2001 | |
| JP | 2001219280 A | | 8/2001 | |
| JP | 2002263863 A | | 9/2002 | |
| JP | 2004017128 A | | 1/2004 | |
| JP | 2004025296 A | | 1/2004 | |
| JP | 2006000858 A | * | 1/2006 | |
| JP | 2007090436 A | | 4/2007 | |
| JP | 4014289 B2 | | 11/2007 | |
| JP | 2007283317 A | * | 11/2007 | |
| JP | 2007283317 A | | 11/2007 | |
| JP | 2008137075 A | | 6/2008 | |
| JP | 2011115842 A | * | 6/2011 | |
| JP | 4838389 B1 | | 12/2011 | |
| JP | 5096640 B1 | * | 12/2012 | ......... B23K 20/1255 |
| WO | 2004067218 A2 | | 8/2004 | |

OTHER PUBLICATIONS

Supplementary European Search Report, mailed Dec. 17, 2015 for European Patent Application No. 12868066.7.

* cited by examiner

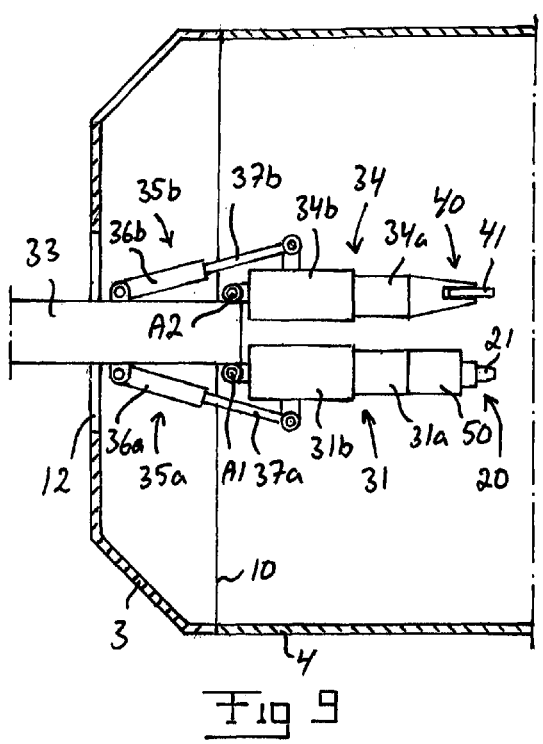
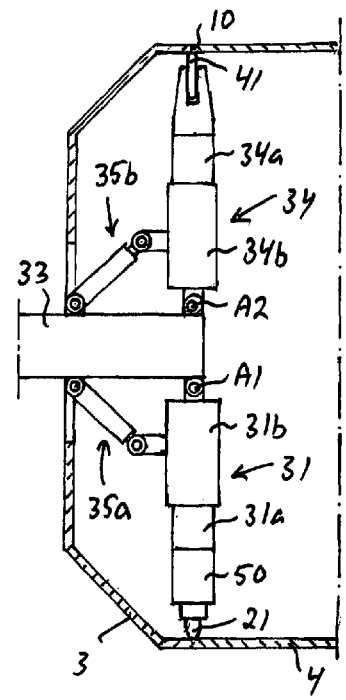
Fig 9
Fig 10
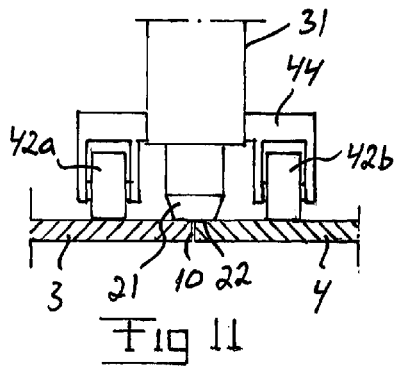
Fig 11
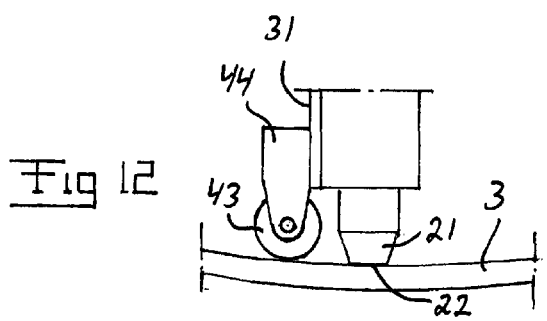
Fig 12
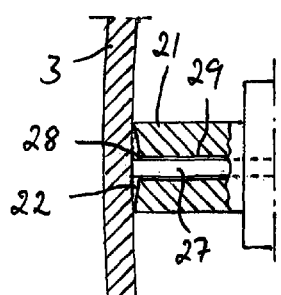
Fig 13

BACKING ARRANGEMENT FOR USE IN FRICTION STIR WELDING

CROSS-REFERENCE TO RELATED APPLICATION

This is a national stage application of pending PCT Application No. PCT/SE2012/050127 filed Feb. 9, 2012, by Rolf Larsson, titled "Backing Arrangement for Use in Friction Stir Welding", which is incorporated herein by reference in its entirety.

FIELD OF THE INVENTION AND PRIOR ART

The present invention provides a backing arrangement according to the preamble of patent claim 1 to support a welded seam that extends on a curved path which is formed between two curved work pieces by friction stir welding with a welding tool that is detached from a backing arrangement. The invention also provides a method according to the preamble to patent claim 12 for fitting together two curved work pieces along a seam extending between the work pieces on a curved path via friction stir welding.

Friction stir welding is a well-known and proven welding method which, among other things, can be used to fit together work pieces and for repair of cracks in a work piece. Two work pieces that are fitted to each other with the aid of friction stir welding are plasticized along their joining line by frictional heating from a rotating welding tool that traverses the seam between the work pieces simultaneous with being pressed against the work pieces, which, during the welding operation, are to be fixed relative to each other. The welding tool comprises a rotating body which, during the welding operation, is pressed against the work pieces and a pin that extends out from the body which is guided forward while rotating in the seam between the work pieces in pressing action with the work pieces. As is described in WO 93/10935 A1 and WO 95/26254 A1, the welding tool is to be manufactured of a material harder than the work pieces. The welding tool can be made to traverse the seam between the work pieces by moving the welding tool along, with the work pieces placed stationary, or by moving the work pieces relative to a welding tool placed in stationary fashion.

With friction stir welding, the welding tool must be pressed with great force against the work pieces to make it possible to frictionally heat them enough to cause the desired plasticizing of the work pieces in the seam between them. If a welding tool is used that has a fixed or retractable pin, a backing must be applied against the back side of the work pieces opposite the welding tool to admit at least a portion of the compression force that is exerted by the welding tool against the work pieces and, to keep the material plasticized during the welding operation in the area of the welded seam. During welding of flat work pieces, for example, it is usually simple to arrange for a backing against the rear side of the work pieces, for example by letting the work pieces rest against a planar backing in the form of an elongated beam or work table. When friction stir welding is used, for example, to join hollow cylindrical work pieces, along a seam that extends in the circumferential direction of the work pieces, it becomes more problematical, however, to create the requisite backing, especially if the work pieces are to be joined to form a container with a relatively small access opening, such as for example a fuel tank for a spacecraft or aircraft. In the latter case it is for example possible to use a removable, annular backing that is tensioned against the work pieces inside them, as is described for example in U.S. Pat. No. 6,247,634 B1. However, one drawback of such a backing is that it must be specially adapted to the dimensions of the work pieces that are to be joined, and installation and removal of the backing within the work pieces may be difficult and time-consuming. In U.S. Pat. No. 6,070,784 A, a description is given of an alternative solution, where a rotatable backing roller, carried by a support arm, is applied to the work pieces within them. One drawback of the latter solution is that the support rollers manifest a limited, linear contact surface against the work pieces, which makes heavy demands for a correct positioning of the backing rollers relative to the welding tool applied to the outside of the work pieces, so that a good quality weld can be created.

With friction stir welding it is also important to use a welding tool in the form of a so-called Bobbin tool, which is a welding tool where a backing piece is fixed to the welding tool pin. In this case the backing device together with the welding tool traverses the seam between the work pieces that are to be joined. This solution, which is described for example in U.S. Pat. No. 6,237,835 B1, can be used, among other things, to join hollow cylindrical work pieces along a seam that extends in the circumferential direction of the work pieces. One drawback with this solution, however, is that it requires relatively extensive preparations to set the welding tool up for welding, including preliminary drilling of a hole in the work pieces for the welding tool pin from the inside of the work pieces. After the welding operation has been completed, in addition a hole remains in the work pieces. Another drawback is that this type of friction stir welding is a relatively sensitive welding process and requires the use of a relatively expensive welding tool.

GOAL OF THE INVENTION

The goal of the present invention is to produce a new and advantageous backing arrangement which is suited for use to support a welded seam that extends on a curved path, which is formed between two curved work pieces by means of friction stir welding.

SUMMARY OF THE INVENTION

According to the invention, the goal is reached with the aid of a backing arrangement shown in the features defined in patent claim 1.

This invention-specific backing arrangement comprises:
A backing body which is intended to bear upon the work pieces opposite a welding tool separate from the backing arrangement, to assume at least a part of the compression force that is exerted by the welding tool against the work pieces to keep the material plasticized during the welding operation in the area of the welded seam, wherein the backing body is equipped with a shoulder which exhibits a bottom surface turned outwards, by means of which the backing device is equipped to bear on the work pieces,
A machine stand to hold the backing body, and
A driving mechanism that is situated to rotate and/or oscillate the shoulder so that the bottom surface of the shoulder can thereby be made to carry out a rotating and/or oscillating motion against the work pieces for creating fictional heat in them.

During the welding operation, the backing body in the invention-specific backing arrangement should stay positioned opposite the welding tool. If the work pieces move relative to a stationary welding tool during the welding operation, then the backing device also should be kept in a stationary position, and if the welding tool moves relative to stationary work pieces, then the backing body should move synchronously with the welding tool.

With the invention-specific solution it will be possible to use a simply designed backing body that is relatively small and compact and thereby in a simple manner it can be inserted in a space within the work pieces which are to be joined via a small access opening. Despite the relatively small size of the backing body, the backing body will exhibit a relatively large surface to the work pieces, which implies reduced demands for precision in positioning of the backing body relative to the welding tool situated on the opposite side of the work pieces. The frictional heat which is created during the action of the backing body shoulder provides added heat which contributes to the desired plasticization of the work pieces when making joints between them.

According to one embodiment form of the invention, a recess is provided to admit an external end of a rotary pin in the welding tool situated in the bottom surface of the shoulder, preferably in the center of the bottom surface. Thanks to this recess, it becomes possible to let the welding tool pin extend entirely through the joint between the work pieces and a bit into the shoulder situated on the inner side of the work pieces, through which it is ensured that the pin extends sufficiently deeply into the seam.

According to another embodiment form of the invention, a notch is situated in the bottom surface of the shoulder, wherein this notch extends from the said recess to the side surface of the shoulder. This notch is provided to extend back from the recess in order by this means to make it possible to produce a thickening of the working piece material along the welded seam being formed.

According to another embodiment form of the invention, additional material is situated to feed work pieces in the area of the welded seam by means of an outflow opening placed in the bottom surface of the shoulder.

Another embodiment form of the invention is characterized by:

The backing body being fixed at the outer end on a carrier arm included in the machine stand, and That the machine stand comprises an elongated carrier element, wherein the said carrier arm is supported by the carrier element and is pivotable relative to the carrier element between a retracted position and an extended position. With the backing arm in this retracted position, it becomes possible to guide the backing arm and the appurtenant backing device through a relatively small access opening in a work piece to then later swing the backing arm out to its working position within the work pieces and thereby bring the shoulder of the backing device to adhere to the inside of the work pieces opposite the welding tool placed on the opposite side of the work pieces.

Other advantageous features of the backing arrangement according to the invention are derived from the dependent patent claims and the specification following below.

The invention also provides a method disclosing the features defined in patent claim 12 for joining two curved work pieces along a seam extending in curved path between the work pieces by means of friction stir welding.

BRIEF DESCRIPTION OF THE DRAWINGS

The invention will be described in greater detail in what follows with the aid of an embodiment example, with reference to the appended drawings. Shown are.

DETAILED DESCRIPTION OF THE EMBODIMENT FORMS OF THE INVENTION

Figure 1:
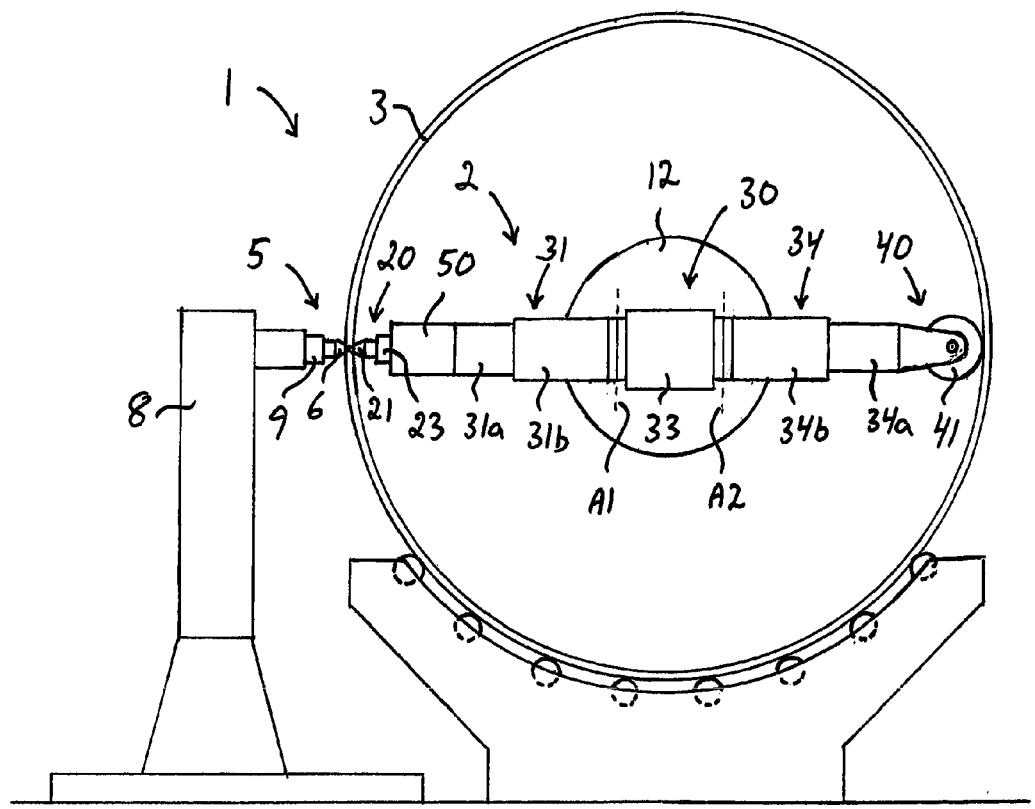
FIG. 1 a schematic illustration of a welding station for friction stir welding, comprising a backing arrangement according to an embodiment form of the present invention FIG. 2 a partial enlargement of parts included in the welding station according to FIG. 1

FIG. 1 depicts a welding station 1 for friction stir welding, comprising a backing arrangement 2 according to an embodiment form of the present invention. The depicted welding station 1 is configured for joining of work pieces 3, 4 (also see FIGS. 8-10) with a circular cross sectional form to create fuel tanks, for example, for spacecraft or aircraft. Welding station 1 comprises a welding tool 5 for friction stir welding of a conventional shaping with a rotary body 6 and a pin 7 extending from the body. In the depicted example, the pin 7 is fixed to body 6 so as to rotate together with it. The body 6 is connected in rotationally rigid fashion with a spindle 9 supported so as to rotate in a machine base 8. This spindle 9 rotates with the aid of a drive unit (not shown) placed in the machine base 8, for example in the form of an electric or hydraulic motor. The two work pieces 3, 4 which are to be joined are kept fixed relative to each other during the welding operation by fixed tensioning tools which are not shown.

During the welding operation, the welding tool 5 traverses a seam 10 which extends between work pieces 3, 4 on a curved path while the body 6, rotating at high speed, is pressed against the outside of work pieces 3, 4 at the same time as pin 7 is advanced while rotating in seam 10 in a compressing action against the work pieces. By rotation of body 6 against the outside of work pieces 3, 4 frictional heat is generated, which plasticizes the end edges of the work pieces in the area closest to pin 7. In the depicted example, seam 10 extends in the circumferential direction of the work pieces, with the seam consequently extending on a circular path, since the depicted work pieces 3, 4 exhibit a circular cross-sectional form.

The backing arrangement 2 comprises a backing body 20 which is provided to bear on work pieces 3, 4 opposite the rotating body 6 and pin 7 of the welding tool, to admit at least a part of the compression force which via body 6 is exerted by welding tool 5 against work pieces 3, 4 to keep the material plasticized during the welding operation in the area of the welded seam. The backing body 20 is equipped with a shoulder 21 which exhibits a bottom surface 22 turned outward, via which the backing body is equipped to bear on work pieces 3, 4. On the inner side of work pieces 3, 4, the bottom surface 22 of the shoulder thus covers an area around the part of seam 10 that currently is being acted on by the rotating body 6 and pin 7 of the welding tool. The bottom surface 22 of the shoulder can be shaped to be either concave, convex or planar.

The backing arrangement 2 comprises a drive mechanism 50 which is placed so as to rotate and/or oscillate shoulder 21 so that the bottom surface 22 of the shoulder thereby is caused to make a rotating and/or oscillating motion against work pieces 3, 4 during the welding operation to increase frictional heat in them. Drive mechanism 50 may, for example, consist of an electric or hydraulic motor. The shoulder 21 can be configured to be pressed against work pieces 3, 4 with an essentially constant pressure, or alternatively with a varying pressure to obtain a pulsating action of shoulder 21 vis-à-vis the work pieces.

Figure 4:
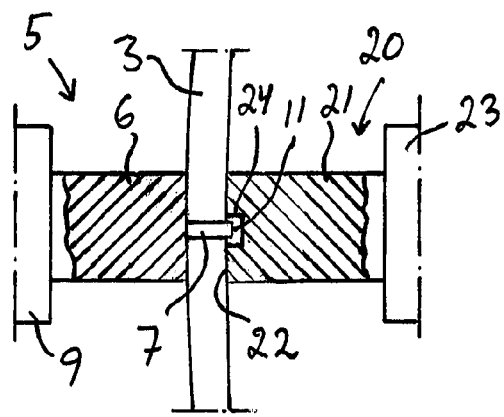
FIG. 4 A partial cut-away enlargement of a detail corresponding to FIG. 2, with a backing body having a first alternative configuration FIG. 5 A front view of a shoulder of the backing body according to FIG. 4

The shoulder 21 of the backing body should be manufactured of a harder material than the work pieces 3, 4 as is the body 6 and pin 7 of the welding tool. For example, shoulder 21 may be made of heat-resistant tool steel. The shoulder 21 may be cylindrical, as is shown in FIGS. 4 and 13, or taper conically in the direction of the bottom surface 22, as illustrated in FIGS. 2 and 11-13. However, the shoulder 21 may also have some other suitable shape.

Figure 2:
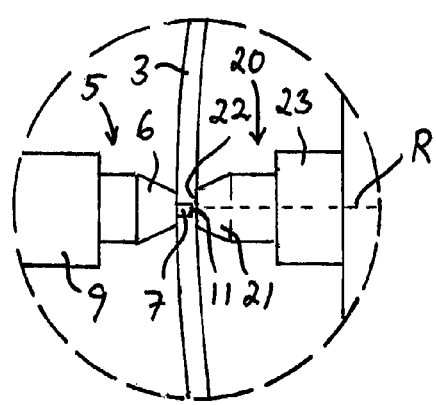
Figure 3:
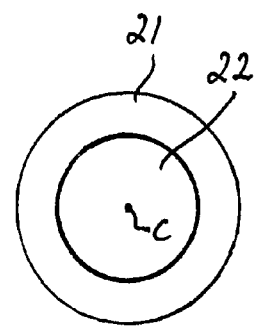
FIG. 3 a front view of a shoulder of the backing body included in the backing arrangement according to FIG. 1

In the embodiment forms depicted in FIGS. 1-3, the bottom surface 22 has a circular periphery, and in this case the drive mechanism 50 is configured to rotate shoulder 21 about a rotational axis R which coincides with a center axis C on the bottom surface 22 of the shoulder. In this case, shoulder 21 is connected in rotationally rigid fashion with a spindle 23 supported so as to rotate, which is rotated with the aid of drive mechanism 50.

Figure 5:
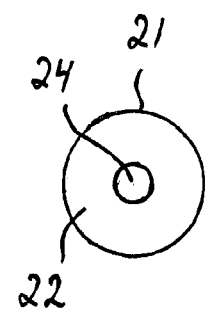

The welding tool pin 7 should not come in contact with shoulder 21 during the welding operation. This can be implemented, for example, by using a pin 7 which is somewhat shorter than the depth of the seam 10 between work pieces 3, 4 so that the outer end 11 of the pin comes during the welding operation to be a short distance from the bottom surface 22 of the shoulder, as depicted in FIG. 2. Alternatively, a recess 24 to admit the outer end 11 of the pin can be configured in the bottom surface 22 of the shoulder, as depicted in FIGS. 4 and 5. This recess 24 is preferably placed in the center of bottom surface 22. The recess 24 should have a diameter and a depth such that the outer end 11 of the pin can admitted with play in the recess so that pin 7 will not come in contact with shoulder 21 during the welding operation. In the latter case, pin 7 is somewhat longer than the depth of seam 10 between work pieces 3, 4 and during the welding operation, pin 7 extends all the way through seam 10.

Figure 6:
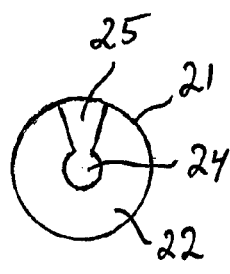
FIG. 6 A front view of a shoulder of a backing body having a second alternative configuration FIG. 7 A front view of a shoulder of a backing body having a third alternative configuration FIG. 8 A schematic side view of a backing arrangement of the welding station according to FIG. 1, with a carrier arm and support arm included in the backing arrangement, shown in a retracted position FIG. 9 a schematic side view of parts included in the backing arrangement according to FIG. 8, having a carrier arm and support arm shown in a retracted position FIG. 10 a schematic side view corresponding to FIG. 9, but having the carrier arm and support arm shown in a deployed position FIG. 11 a schematic illustration of parts included in a backing arrangement according to an alternative embodiment form of the invention FIG. 12 a schematic illustration of parts included in a backing arrangement according to another embodiment form of the invention FIG. 13 a schematic partially cut-away side view of parts included in a backing arrangement according to another alternative embodiment form of the invention.

In the embodiment form depicted in FIG. 6, a recess 24 to admit the outer end of the pin is situated in the bottom surface 22 of the shoulder and in addition a notch 25 is placed in the bottom surface 22 of the shoulder. This notch 25 extends from recess 24 to the side surface of the shoulder. The notch 25 is tapered, as seen from the side surface of the shoulder in the direction of the recess 24. In this case, drive mechanism 50 is configured to oscillate shoulder 21 and notch 25 is provided to extend back in the direction of the welded seam being formed, to provide a thickening of the material along the welded seam.

Figure 7:

The bottom surface 22 of the shoulder can be entirely planar, but as an alternative, a raised edge 26 can be configured in a spiral shape on the bottom surface 22 of the shoulder, as depicted in FIG. 7. During the welding operation, this raised edge 26 is provided to pull plasticized material of the work pieces 3, 4 inward toward the center of the bottom surface.

The backing arrangement 2 comprises a machine base 30 to carry backing body 20. In the embodiment form depicted in FIGS. 1, 8, 9 and 10, backing body 20 is carried by a carrier arm 31 included in machine base 30. Backing body 20 is fixed to the outer end of this carrier arm 31. Additionally, machine base 30 comprises a base part 32 (see FIG. 8) and an elongated carrier element 33 which is supported by base part 32. Carrier element 33 can be shifted in its longitudinal direction, for example by being configured to shift relative to base part 32 or by being able to shift together with base part 32. Carrier arm 31 is supported by carrier element 33 and is fixed so as to pivot on the front end of the carrier element. Carrier arm 31 can pivot relative to carrier element 33 between a recessed position (see FIGS. 8 and 9) in which carrier arm 31 extends essentially in the longitudinal direction of the carrier element, and a deployed working position, (see FIGS. 1 and 10), in which carrier arm 31 extends essentially perpendicular to the longitudinal direction of the carrier element.

In the embodiment form depicted in FIGS. 1, 8, 9 and 10, the machine base 30 also exhibits a support arm 34, which at its outer end carries a support device 40. Support arm 34 is carried by carrier element 33 and is fixed so as to pivot on the front end of the carrier element, opposite carrier arm 31. Support arm 34 can be pivoted relative to carrier element 33 between a retracted position (see FIGS. 8 and 9), in which support arm 34 extends essentially in the longitudinal direction of the carrier element, and a deployed support position (see FIGS. 1 and 10), in which support arm 34 extends essentially perpendicular to the longitudinal direction of the carrier element. Support device 40 comprises a support body 41 situated so as to rotate, which is provided to bear on at least some part of work pieces 3, 4 when support arm 34 is in the deployed support position. Support device 40 and support arm 34 are provided to contribute to support carrier arm 31 and carrier element 33 to thereby prevent them from shifting due to the effect of the compression force which, during the welding operation, is exerted by the body 6 of the welding tool in the direction of backing body 20. If necessary, one or more additional support arms 34 with appurtenant support devices 40 may be carried by, and fixed so as to pivot, on carrier element 33. If carrier element 33 is sufficiently rigid, a support arm and support device of the type indicated above do not need to be used. If necessary, support device 40 can comprise two or more support bodies 41 situated so as to rotate. In the depicted example, support device 40 comprises a support body 41 in the form of a support wheel supported so as to rotate.

The machine base 30 is equipped with a maneuvering bodies 35*a*, 35*b* of a suitable type for pivoting of the carrier arm 31 and support arm 34 relative to carrier element 33. In the depicted form, the machine base is equipped with a first maneuvering body 35*a* in the form of a hydraulic cylinder for pivoting of carrier arm 31 relative to carrier element 33 about a first axis A1 of rotation, and a second maneuvering body 35b in the form of a hydraulic cylinder for pivoting of support arm 34 relative to carrier element 33 about a second axis A2 of rotation. The first maneuvering body 35a has a cylindrical part 36a which is joint-connected with carrier element 33 and a piston rod 37a which is joint-connected with carrier arm 31, which the second maneuvering body 35b has a cylindrical part 36b which is joint-connected with carrier element 33 and a piston rod 37b which is joint-connected with support arm 34.

Backing body 20 is suitably adjustable in the longitudinal direction of the carrier arm to allow regulation of the distance between the bottom surface 22 of the shoulder and carrier element 33. In the example illustrated, this is made possible by an outer part 31a of carrier arm 31 being telescopically adjustable in the longitudinal direction of the carrier arm relative to an inner part 31b of the carrier arm. The outer part 31a is shifted relative to the inner part 31b with the aid of a hydraulic cylinder (not shown) or some other suitable maneuvering body.

In a corresponding manner, support body 41 is suitably adjustable in the longitudinal direction of the support arm to allow regulation of the distance between support body 41 and carrier element 33. In the depicted example, this is made possible by an outer part 34a of support arm 34 being telescopically adjustable in the longitudinal direction of the support arm relative to an inner part 34b of the support arm. The outer part 34a is shifted relative to the inner part 34b with the aid of a hydraulic cylinder (not shown) or some other suitable maneuvering body.

In the embodiment form depicted in FIGS. 1, 8, 9 and 10, drive mechanism 50 is situated on carrier arm 31 in the close vicinity to the backing body shoulder 21. However, drive mechanism 50 could be situated alternatively at another place and be connected via a suitable transmission with the backing body shoulder 21.

The welding tool 5 and backing body 20 traverse the seam 10 between work pieces 3, 4 that are to be joined either by having the welding tool 5 and backing body 20 move in synchronism with each other along stationary work pieces, or by having work pieces 3, 4 move while welding tool 5 and backing body 20 are kept in a stationary position. In the welding station 1 depicted in FIGS. 1, 8, 9 and 10, welding tool 5 and backing body 20 are meant to be kept in a stationary position during the welding operation, while work pieces 3, 4 are rotated with the aid of a suitable driving tool which is not shown. Naturally, work pieces 3, 4 are to be kept in a fixed position relative to each other during this rotation.

Figure 8:
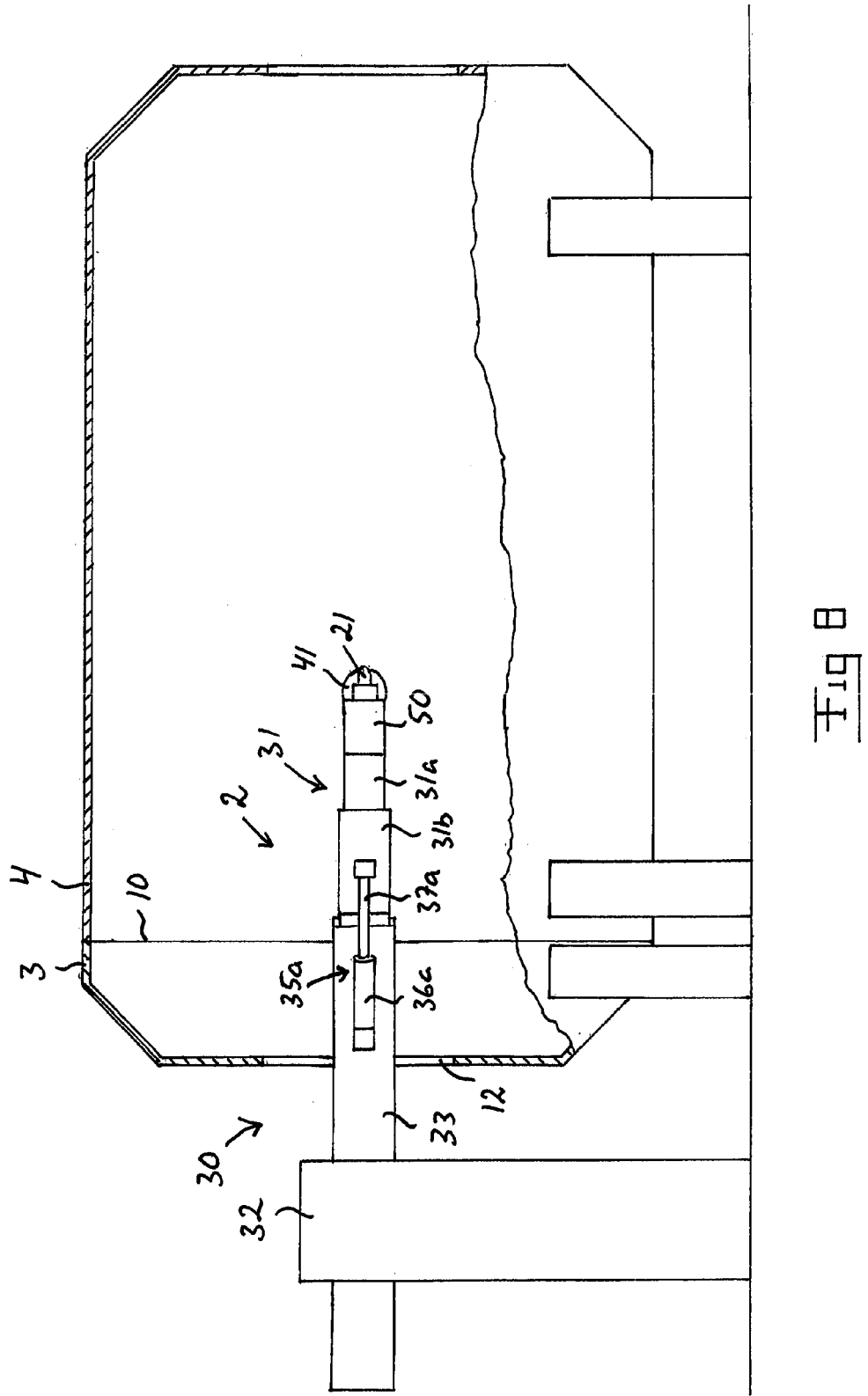

In the depicted example, welding station 1 is used to join a first work piece 3, which is provided for form an end piece of a container, with a second work piece 4, which is provided to form a cylindrical part of a container. With the carrier arm 31 and support arm 34 in a retracted position, the front part of the carrier element 33 together with carrier arm 31, backing body 20, support arm 34 and support device 40 can be inserted into a space within work pieces 3, 4 via an access opening 12 in first work piece 3, as depicted in FIGS. 8 and 9. After insertion into said space, carrier arm 31 and support arm 34 are pivoted into the deployed position, after which the outer part 31a of the carrier arm and the outer part 34a of the support arm are shifted so that bottom surface 22 and support body 41 come to bear on the inner walls of work pieces 3, 4 directly over seam 10. The welding tool body 6 is then compressed against the outer wall of work pieces 3, 4 directly over seam 10 between them and opposite the bottom surface 22 of the shoulder, while the welding tool pin 7 is admitted in seam 10. Then work pieces 3, 4 are rotated at low rotary speed relative to welding tool 5, and backing body 20 so that welding tool 5 and backing body 20 come to traverse seam 10 while the welding tool body 6 and pin 7 and the shoulder 21 of the backing body rotate at high rotary speed to create a welded seam between work pieces 3, 4 due to action of frictional heat that is generated at the contact surfaces between working pieces 3, 4 and the welding tool body 6 and contact surfaces between working pieces 3, 4 and the shoulder of backing body 21. The material plasticized by frictional heat is kept under the action of the welding tool body 6 and shoulder 21 of the backing body in the area of seam 10, where it then solidifies to form a welded seam between work pieces 3, 4. During the welding operation, work pieces 3, 4 are kept in tension relative to each other with the aid of a fixed tensioning device (not shown) in such a way that seam 10, i.e. the air gap, between the work piece edge ends turned toward each other, does not exceed the size at which a substandard weld is formed.

To ensure that the desired welding temperature is reached more quickly, it is possible to supply extra heat to the body 6 and/or shoulder 21 before and/or during the welding operation, for example by electrical heat generation.

If so desired, additional material 27, provided in the form of a wire or rod, can be fed to the working pieces during the welding operation via a drain opening 28 placed in the bottom surface 22 of the shoulder, as depicted in FIG. 13. This drain hole 28 is suitably situated in the center of the bottom surface 22 of the shoulder. In this case, the backing arrangement 2 should be equipped with feeding devices (not shown) to feed the said additional material 27 through a channel 29 placed in the shoulder 21, which is connected to the said drain opening 28.

One or more compression rollers 42a, 42b, 43 can advantageously be situated so as to rotate at the outer end of carrier arm 31 at the side of the backing body shoulder 21, wherein the compression rollers are situated to bear on at least some part of work pieces 3, 4 during the welding operation. These compression rollers 42a, 42b, 43 limit the penetration depth of the shoulder into work pieces 3, 4 and contribute to support the work pieces internally so as to reduce the risk of the work pieces buckling during the welding operation. For example, two compression rollers 42a, 42b can be placed on both sides of the backing body shoulder 21 to bear on work pieces 3, 4 one on each side of seam 10, between them, as FIG. 11 depicts. As an alternative, a compression roller 43 can be situated ahead of the backing body shoulder 21 to bear on work pieces 3, 4 directly over seam 10 between them. The compression rollers 42a, 42b, 43 are supported so as to rotate in a holder 44 which is connected to and carried by carrier arm 31.

Naturally, the invention is in no way limited to the embodiment forms described above, but rather a plurality of possibilities for modifications thereof should be obvious to one skilled in the art in the field, without it thus deviating from the basic idea of the invention as it is defined in the appended patent claims.

The invention claimed is:

1. A backing arrangement for supporting a welded seam extending on a curved path formed between two curved work pieces by friction stir welding with a welding tool separate from the backing arrangement, the backing arrangement comprising:
   a backing body for bearing upon the work pieces opposite
      a welding tool separate from the backing arrangement, to assume at least a portion of a compression force exerted by the welding tool against the work pieces to maintain the material plasticized during the welding operation in the area of the welded seam, the backing body including a shoulder having a bottom surface configured to bear on the work pieces; and a driving mechanism arranged to at least one of rotate and oscillate the shoulder so that the bottom surface of the shoulder can carry out at least one of a rotating and an oscillating motion against the work pieces for creating fictional heat in the work pieces;

wherein the backing body is fixed at the outer end of a carrier arm of a machine base, the machine base including an elongated carrier element, wherein the carrier arm is supported by the elongated carrier element and is pivotable relative to the elongated carrier element between a retracted position and a deployed working position.

2. The backing arrangement of claim 1, wherein the bottom surface of the shoulder has a circular periphery and the drive mechanism is configured to rotate the shoulder about an axis of rotation coinciding with a central axis of the bottom surface of the shoulder.

3. The backing arrangement of claim 1, wherein a recess is provided to receive an outer end of a rotating pin in the welding tool, the recess being placed at the bottom surface of the shoulder.

4. The backing arrangement of claim 3, wherein the recess is in the center of the bottom surface.

5. The backing arrangement of claim 3, wherein a notch is provided in the bottom surface of the shoulder, and wherein the notch extends from said recess to a side surface of the shoulder.

6. The backing arrangement of claim 5, wherein additional material is feedable to the work pieces via a drainage opening provided in the bottom surface of the shoulder.

7. The backing arrangement of claim 6, wherein the said drainage opening is situated in the center of the bottom surface of the shoulder.

8. The backing arrangement of claim 7, wherein the bottom surface of the shoulder has a concave, convex or planar shape.

9. The backing arrangement of claims 8, wherein a raised edge comprises a spiral shape on the bottom surface of the shoulder.

10. The backing arrangement of claim 1, wherein one or more compressing rollers are positioned to rotate at the outer end of the carrier arm at the side of the shoulder of the backing body, wherein the one or more compressing rollers are positioned to bear on at least some portion of the work pieces during the welding operation.

11. The backing arrangement of claim 1, wherein the carrier arm is a first carrier arm, the backing arrangement further comprising a second carrier arm that is supported by the elongated carrier element and is pivotable relative to the elongated carrier element between a retracted position and a deployed support position, the second carrier arm having at its outer end a rotatably mounted support device configured to bear on at least a portion of the work pieces when the second carrier arm is in the deployed support position.

12. A method for joining two curved work pieces along a seam extending between the work pieces on a curved path by friction stir welding with the aid of a welding tool which comprises a body and a pin extending from the body, wherein the welding tool traverses said seam during the welding operation while the body is compressed against the outer side of the work pieces at the same time as the pin is advanced while rotating in the seam;

wherein a bottom surface of a shoulder of a backing body detached from the welding tool is held during the welding operation bearing on the inner side of the work pieces opposite said welding tool to provide at least a part of the compressing force that is exerted by the welding tool body against the work pieces to keep material plasticized during the welding operation in the area of the welded seam formed by the welding tool, wherein the backing body shoulder is at least one of rotated and oscillated using a drive mechanism during the welding operation so that the bottom surface of the shoulder executes at least one of a rotating and an oscillating motion against the work pieces to create frictional heat in them;

wherein the backing body is fixed at the outer end of a carrier arm of a machine base, the machine base including an elongated carrier element, wherein the carrier arm is supported by the elongated carrier element and is pivotable relative to the elongated carrier element between a retracted position and a deployed working position; and wherein the backing body, being fixed at the outer end of a carrier arm of a machine base, is pivoted relative to a carrier element to which the carrier arm is pivotably attached between a retracted position and a deployed working position.

13. The method of claim 12, wherein additional material is provided to the work pieces via a drainage opening positioned in the bottom surface of the shoulder.

14. The method of claim 13, wherein additional heat is provided to the shoulder at least one of before and during the welding operation.

* * * * *